J. C. HOWE.
CONVEYER CHAIN.
APPLICATION FILED JULY 21, 1915.
1,188,657.
Patented June 27, 1916.
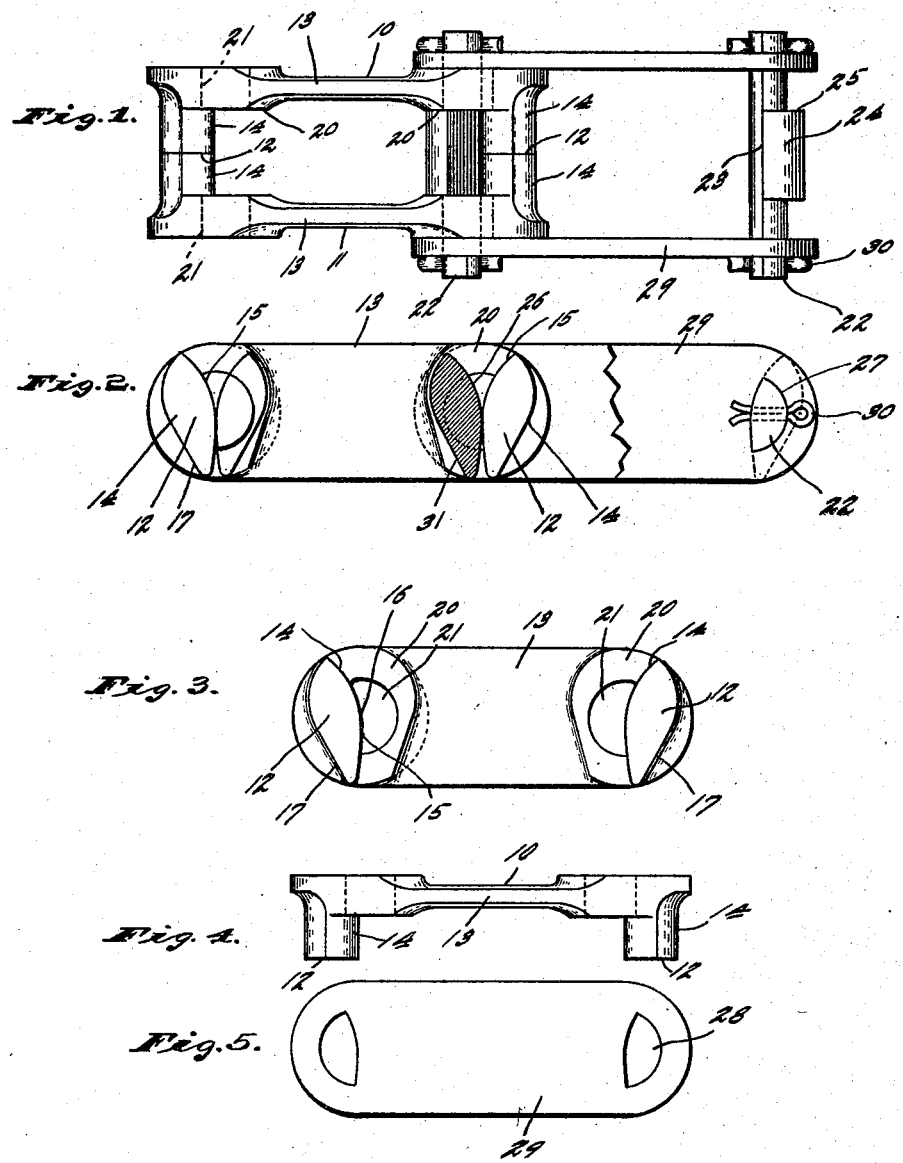
WITNESS
Frank A. Fahle
INVENTOR
John C. Howe
BY
Hood &Schley.
ATTORNEY

UNITED STATES PATENT OFFICE.

JOHN C. HOWE, OF INDIANAPOLIS, INDIANA.

CONVEYER-CHAIN.

1,188,657.   Specification of Letters Patent.   Patented June 27, 1916.

Application filed July 21, 1915. Serial No. 41,033.

*To all whom it may concern:*

Be it known that I, JOHN C. HOWE, a citizen of the United States, residing at Indianapolis, in the county of Marion and State of Indiana, have invented a new and useful Conveyer-Chain, of which the following is a specification.

It is the object of my present invention to provide a sprocket chain which is at once strong and simple, so that it can be cheaply manufactured and assembled, and can be made largely from stampings and drop forgings; and which is preferably a silent chain and which is adapted for use as a conveyer chain.

The accompanying drawing illustrates my invention.

Figure 1 is a plan view of two adjacent links of a chain embodying my invention; Fig. 2 is a front elevation of such chain, with the front half of the left hand link removed and with part of the right hand link broken away or in section; Fig. 3 is an elevation of one of the halves of one of the narrow links—the left hand link in Fig. 1; Fig. 4 is a plan view of such half link; and Fig. 5 is an elevation of one of the longitudinal members of one of the wider links—the right hand link in Fig. 1.

The chain comprises alternate wide and narrow links. The narrow links comprise two mating parts 10 and 11, which fit together on faces 12 in the center line of the chain (see Fig. 1). Each of the parts 10 and 11 may be made as a unit, conveniently of malleable iron or as a drop forging, and comprises a longitudinal portion 13 extending longitudinally of the chain and two lateral inward projections 14 at the ends. The projections 14 mate on the faces 12. The projections 14 are provided on their sides toward the center of the link with convex cylindrical surfaces 15, in which lie the axes of articulation 16 between adjacent links; and are provided on their faces away from the center of the link with plane surfaces 17 which are at equal and opposite angles to the line joining the axes of articulation of the link and coöperating with plane surfaces on the teeth of the sprocket wheel in the usual manner of silent chains. The two surfaces 17 are at a fixed angle to each other.

The ends of the members 13 are enlarged to provide bosses 20, through which extend approximately sector-shaped holes 21 bounded on one side by the surfaces 15 and on the other by concave cylindrical surfaces having as their axes the axes of articulation 16. These holes 21 receive the ensmalled ends 22 of cross pins 23, each of which has an intermediate enlarged portion 24 the ends of which provide shoulders 25 for bearing against the bosses 20. The enlarged portion 24 and the ensmalled ends 22 on their side toward the coöperating portions 14, are flush on a convex cylindrical surface 26 corresponding to the coöperating surface 15 but oppositely curved, the surfaces 15 and 26 rolling on each other. The ensmalled ends 22 are provided on their sides away from the projections 14 with convex cylindrical surfaces 27 which fit in the concave cylindrical surfaces of the holes 21 but are of less angular extent so as to permit the desired articulation. The ensmalled ends 22 also project through and fit tightly in holes 28 in longitudinal side bars 29 which with the cross bars 23 form the wider links of the chain, the cross bars 23 being held in place in the longitudinal bars 29 by cotter pins 30. The side bars or longitudinal members 29 may be made of punchings of sheet metal. The enlarged portions 24 of the cross bars 23 are provided on their faces remote from the coöperating projections 14 with plane surfaces 31, which bear the same relation to the wider links as do the surfaces 17 to the narrow links, and similarly coöperate with plane surfaces on the sprocket wheel teeth.

In operation, the adjacent links of the chain articulate on the axes 16, or substantially so, by a rolling engagement of the surfaces 15 and 26 on each other. The surfaces 17 and 31 engage with the plane surfaces on the sprocket wheel teeth in the usual fashion of silent chains. The chain is readily assembled by placing the members 10 and 11 over the ensmalled ends 22 of the cross bars 23, then placing the side bars 29 on such ensmalled ends on the outer sides of the members 10 and 11, and inserting the cotter pins 30. The chain may be taken apart by the reverse operation, and may thus be readily lengthened and shortened. The parts 10, 11, and 23 may all be either malleable iron or drop forgings, and the parts 29 may be stampings from sheet metal, so that all the parts may be made simply and cheaply.

I claim as my invention:

1. A silent chain composed of alternate wide and narrow links, said narrow links being made in two longitudinal mating members having integral longitudinally extending portions and lateral projections toward the mating members, said members being provided with transverse openings, and said wider links comprising cross bars projecting through the openings in said first-named longitudinal members and having a rolling engagement with said lateral projections on convex cylindrical surfaces on both the cross bars and the lateral projections, and side bars interconnecting said cross bars in pairs to form the wider links, said projections and said cross bars being provided with plane surfaces which are fixed relatively to each other on each link.

2. A chain composed of alternate wide and narrow links, said narrow links being made in two longitudinal mating members having integral longitudinally extending portions and lateral projections toward the mating members, said members being provided with transverse openings, and said wider links comprising cross bars projecting through the openings in said first-named longitudinal members and having a rolling engagement with said lateral projections on convex cylindrical surfaces on both the cross bars and the lateral projections and side bars interconnecting said cross bars in pairs to form the wider links.

3. A silent chain composed of alternate wide and narrow links, said narrow links being made in two longitudinal mating members having integral longitudinally extending portions and lateral projections toward the mating members, said members being provided with transverse openings, and said wider links comprising cross bars projecting through the openings in said first-named longitudinal members and having a rolling engagement with said lateral projections, and side bars interconnecting said cross bars in pairs to form the wider links, said projections and said cross bars being provided with plane surfaces which are fixed relatively to each other on each link.

4. A chain composed of alternate wide and narrow links, said narrow links being made in two longitudinal mating members having integral longitudinally extending portions and lateral projections toward the mating members, said members being provided with transverse openings, and said wider links comprising cross bars projecting through the openings in said first-named longitudinal members and having a rolling engagement with said lateral projections, and side bars interconnecting said cross bars in pairs to form the wider links.

5. A chain composed of alternate wide and narrow links, said narrow links being made in two longitudinal mating members having integral longitudinally extending portions and lateral projections toward the mating members, said members being provided with transverse openings, and said wider links comprising cross bars projecting through the openings in said first-named longitudinal members and having a rolling engagement with said lateral projections, and side bars interconnecting said cross bars in pairs to form the wider links, said cross bars having enlarged middle portions which at their ends form shoulders to bear against the two members of the narrow links.

6. A silent chain composed of alternate wide and narrow links, said narrow links being made in two longitudinal mating members having integral longitudinally extending portions and lateral projections toward the mating members, said members being provided with transverse openings, and said wider links comprising cross bars projecting through the openings in said first-named longitudinal members and having a rolling engagement with said lateral projections, and side bars interconnecting said cross bars in pairs to form the wider links, said projections and said cross bars being provided with plane surfaces which are fixed relatively to each other on each link, said cross bars having enlarged middle portions which at their ends form shoulders to bear against the two members of the narrow links and said plane surfaces on said cross bars being on said enlarged middle portions.

7. A silent chain composed of alternate wide and narrow links, said narrow links being made in two longitudinal mating members having integral longitudinally extending portions and lateral projections toward the mating members, said members being provided with transverse openings, and said wider links comprising cross bars projecting through the openings in said first named longitudinal members and engaging said lateral projections, and side bars interconnecting said cross bars in pairs to form the wider links, said projections and said cross bars being provided with plane surfaces which are fixed relatively to each other on each link.

8. A chain composed of alternate wide and narrow links, said narrow links being made in two longitudinal mating members having integral longitudinally extending portions and lateral projections toward the mating members, said members being provided with transverse openings between the lateral projections, and said wider links comprising cross bars projecting through the openings in said first-named longitudinal members and engaging said lateral projections, and side bars interconnecting said cross bars in pairs to form the wider link.

In witness whereof, I have hereunto set my hand at Indianapolis, Indiana, this 13th day of July, A. D. one thousand nine hundred and fifteen.

JOHN C. HOWE.